United States Patent [19]

Moon

[11] Patent Number: 5,135,045
[45] Date of Patent: Aug. 4, 1992

[54] SPACE TEMPERATURE CONTROL SYSTEM AND CONTROL METHOD THEREOF

[75] Inventor: Joong K. Moon, Suweon, Rep. of Korea

[73] Assignee: Samsung Electronics Co., Ltd., Rep. of Korea

[21] Appl. No.: 525,980

[22] Filed: May 21, 1990

[30] Foreign Application Priority Data

May 23, 1989 [KR] Rep. of Korea .................... 6890/89

[51] Int. Cl.$^5$ ............................................. G05D 23/00
[52] U.S. Cl. ........................................ 165/2; 236/51; 340/870.17; 374/170
[58] Field of Search ............ 236/51, 38, 11, 78 B; 374/170; 340/870.17; 165/2

[56] References Cited

U.S. PATENT DOCUMENTS

| | | | |
|---|---|---|---|
| 4,433,719 | 2/1984 | Cherry et al. | 236/51 |
| 4,562,554 | 12/1985 | Strixrud et al. | 374/170 X |
| 4,716,411 | 12/1987 | Nakamura | 340/870.17 |
| 4,839,645 | 6/1989 | Lill | 340/870.17 |

FOREIGN PATENT DOCUMENTS

| | | | |
|---|---|---|---|
| 0194155 | 8/1988 | Japan | 236/51 |
| 2183068 | 5/1987 | United Kingdom | 236/51 |

Primary Examiner—William E. Wayner
Attorney, Agent, or Firm—Sterne, Kessler, Goldstein & Fox

[57] ABSTRACT

Air conditioning and heating system drives convection fan motor to control distribution of indoor temperature by controlling device with the first sensor and the second sensor, wherein the first sensor and the second sensor is individually connected to controlling device of air conditioning and heating set, and radio transmission device is attached to air conditioning and heating set and remocon. According to difference of temperature between remocon and air conditioning and heating set, main controlling device controls convection motor, electronic pump, driver controlling portion. It has higher heat efficiency by dividing operation of emitting heat and cooling device into more steps.

2 Claims, 7 Drawing Sheets

| SET TEMP. − REMOCON TEMP. / SET TEMP. | +1°c | +2°c | +3°c ~ +5°c |
|---|---|---|---|
| 30°c | +3 | +4 | +4 |
| 25°c ~ 29°c | +2 | +3 | +3 |
| 20°c ~ 24.9°c | +2 | +2 | +3 |
| 15°c ~ 19.9°c | +1 | +2 | +2 |
| 12°c ~ 14.9°c | +1 | +1 | +2 |
| 12°c | 0 | 0 | 0 |

Fig. 6

| 1A  ØØ  | DATA 1  |
|---------|---------|
| 1A  Ø1  | DATA 2  |
| 1A  Ø2  | DATA 3  |
| 1A  Ø3  | DATA 4  |
| 1A  Ø4  | DATA 5  |
| 1A  Ø5  | DATA 6  |
| 1A  Ø6  | DATA 7  |
| 1A  Ø7  | DATA 8  |
| 1A  Ø8  | DATA 9  |
| 1A  Ø9  | DATA 10 |
| 1A  Ø10 | DATA 11 |
| 1A  Ø11 | DATA 12 |
| 1A  Ø12 | DATA 13 |
| ⋮       | ⋮       |
| 1A  1C  | DATA 29 |
| 1A  1D  | DATA 30 |
| 1A  1E  | DATA 31 |

Fig. 7

SPACE TEMPERATURE CONTROL SYSTEM AND CONTROL METHOD THEREOF

BACKGROUND OF THE INVENTION

The invention relates to temperature control and control of air convection current, and particularly relates to air conditioning and heating systems controlled by remote control with temperature sensor(s) to force the distribution of room temperature to be constant.

PRIOR ART

Air conditioning and heating system controls mostly distribute room temperature with a convection fan motor. However, prior systems do not have means for sensing the distribution of room temperature or unsuitable condition sensing means. Prior systems have many defects including the inability to form comfortable environments by keeping temperature uniformly distributed indoors.

An example of a prior heating system is taught in Japanese Patent Publication Nos. 56-947 and 56-946. These heating systems have a burning compartment which operates in two steps, including a strong step and a weak step. The rpm of a fan motor is controlled by a predetermined program so that the burning operation is converted to the weaker state when the difference between a setting and the outdoor temperature is below a reference level.

Another prior system is taught in Japanese Patent Publication No. 61-15042. The temperature control operates as follows. When a burning portion is turned on, the temperature in the burning portion rises. Then a heating system control means receives a temperature t of the heating system from the first sensor and the setting temperature T1 from the portion implemented with a second sensor.

Setting temperature T1 is corrected to temperature T2 according to an indoor temperature by a control unit which checks whether the indoor room temperature is above 20° C. This forces temperature t of the heating system to rise, and converts setting temperature T2 to indoor temperature. Within the temperature range of 5° C.-20° C., the control unit decreases the temperature setting by 1° C., when indoor temperature increases by 1° C. and increases temperature setting by 1° C. when the indoor temperature decreases by 1° C. This occurs because one senses the difference between the outdoor temperature and the temperature in proximity to the heating system. The other senses the distribution of indoor temperature in proximity to the heating system with sensors attached to the heating system.

A limitation of this system is that the control means does not sense the temperature in proximity to the user. In addition, the first sensor and the second sensor are connected to the control system by wires, and thus only sense the difference in temperature in two predetermined areas.

Because the control of the amount of heat emission according to the difference in temperature is simple, distribution of indoor temperature is controlled ineffectively and the heat efficiency of the heating system is not ideal.

SUMMARY OF THE INVENTION

With the present invention, the emitting operation is divided into multiple steps according to the difference between the temperature at a remote control sensor and the temperature at a sensor of air conditioning and heating set to overcome defects of the prior art. The temperature sensor is attached to a remote control which can be separated from the air conditioning and heating system and can be freely moved. It is also necessary that the indoor temperature sensed by remote control is converted to digital data which is transferred to a controlling means, then to the air conditioning and heating system by radio transmission.

Furthermore, it is necessary to overcome the difference in distribution of indoor temperature by keeping the distribution of indoor temperature constant by controlling the rpm of the convection fan motor, and to divide the emitting operation of the heat and cooling device into multiple steps according to difference in temperature. This allows the air conditioning and heating system to have higher heat efficiency.

Thus, the main object of the invention is supplying an air conditioning and heating system which drives a convection fan motor to control the distribution of indoor temperature by controlling means with a first sensor and a second sensor, wherein the first sensor and the second sensor are individually connected to controlling means of the air conditioning and heating set and remote control, respectively. Radio transmission is used to send remote temperature data to the air conditioning and heating system.

Another object of the invention is to supply an air conditioning and heating system and remote control which sense the temperature difference between the air conditioning and heating system by comparing data from a sensor attached to the air conditioning and heating system with data of a sensor attached to a remote controlled transmitting means, each driving portion to achieve constant distribution of indoor temperature. This results in higher heating efficiency by dividing the operation of the emitting heat and cooling device into more steps.

To achieve such objects, the invention comprises a microcomputer (microprocessor) for controlling all portions, sensing portion sensing the indoor temperature in air conditioning and heating system, remote control including sensing portion 2 which senses indoor temperature in proximity of a user, a transmitting portion which outputs temperature data to the microcomputer in the air conditioning and heating system, means for comparing temperature data of sensing portion 1 with temperature data of sensing portion 2, and means for controlling the rpm of the fan motor and operation of the emitting heating and cooling device.

BRIEF DESCRIPTION OF THE DRAWINGS

The above and other objects of the invention will be seen by the following description in connection with the accompanied drawings, in which:

FIG. 6 is a controlling reference diagram of the convection fan motor showing temperature adjustments; and FIG. 7 is a memory map showing memory storing rpm data of the convection fan motor.

DETAILED DESCRIPTION OF THE PREFERRED EMBODIMENTS

Figure 1:
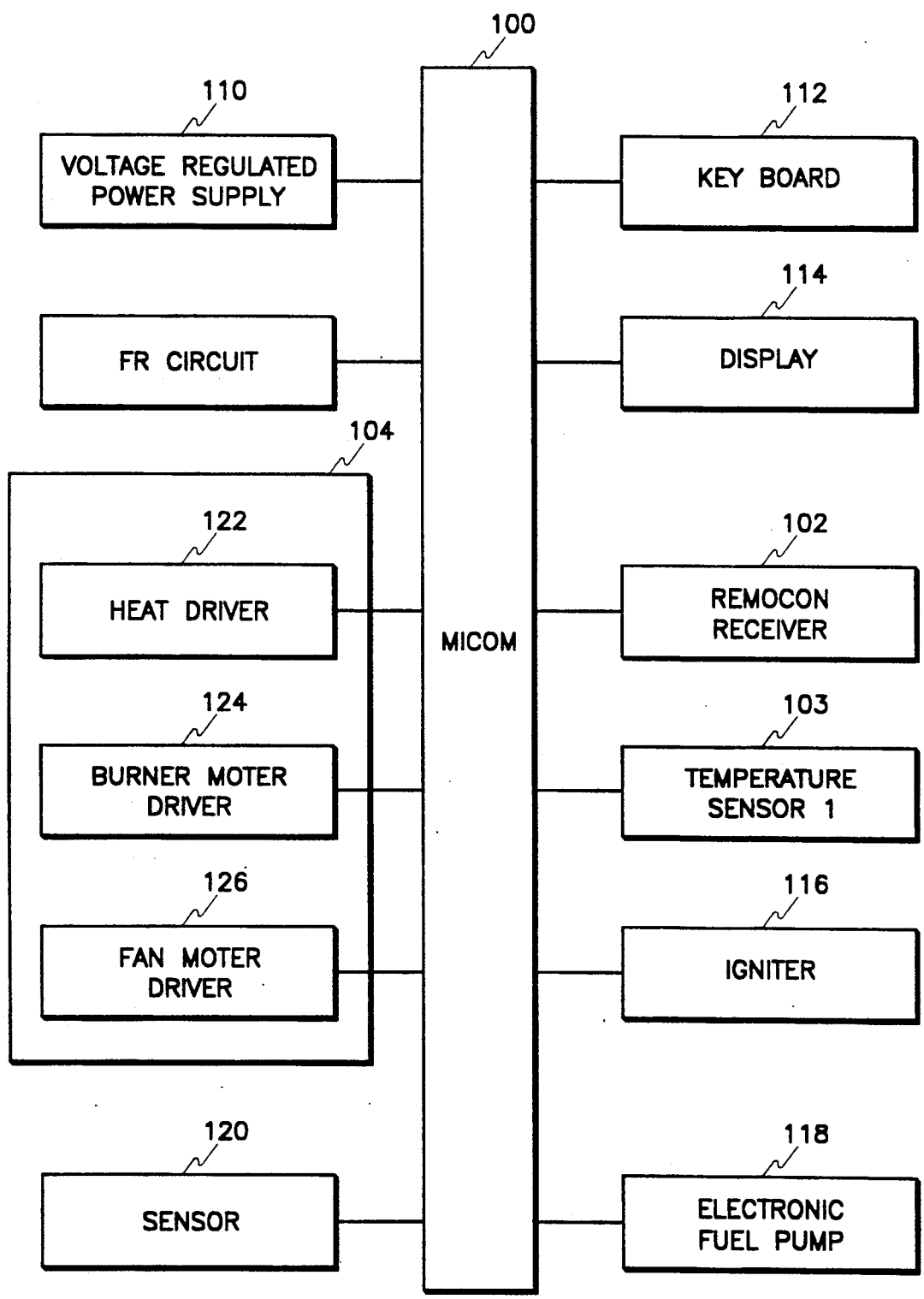
FIG. 1 is a block diagram showing an embodiment of an air conditioning and heating set.

FIG. 1 is a block diagram showing an embodiment of an air conditioning and heating set of the invention. Microprocessor (micom) 100 is used for controlling the entire system. Regulated power supply 110 supplies power to microprocessor 100. Various commands are input to microprocessor 100 through the keyboard 112. Operation of the air conditioning and heating set is shown in the display 114 connected to microprocessor 1. Ignition (IG) portion 116 ignites the burner of the air conditioning and heating set. An electronic pump 118 supplies fuel to the burning portion, and a sensor portion 120 senses abnormal states of the air conditioning and heating system. A driver unit (shown generally at 104) controls various outputs of the main circuit. The driver unit controlling means comprises heater driver 122 setting initial temperature of the burner rising to obtain complete combustion of fuel; burner motor driver 124 controls the amount of air needed in the burning process; and the fan motor driver 126 circulates indoor air to radiate heat generated in burning.

The invention compares the indoor temperature data of sensing portion 103 with temperature data from the remote control by connecting sensing portion 103 and remote control receiving portion 102 to microprocessor 100 as shown in FIG. 1.

Figure 2:
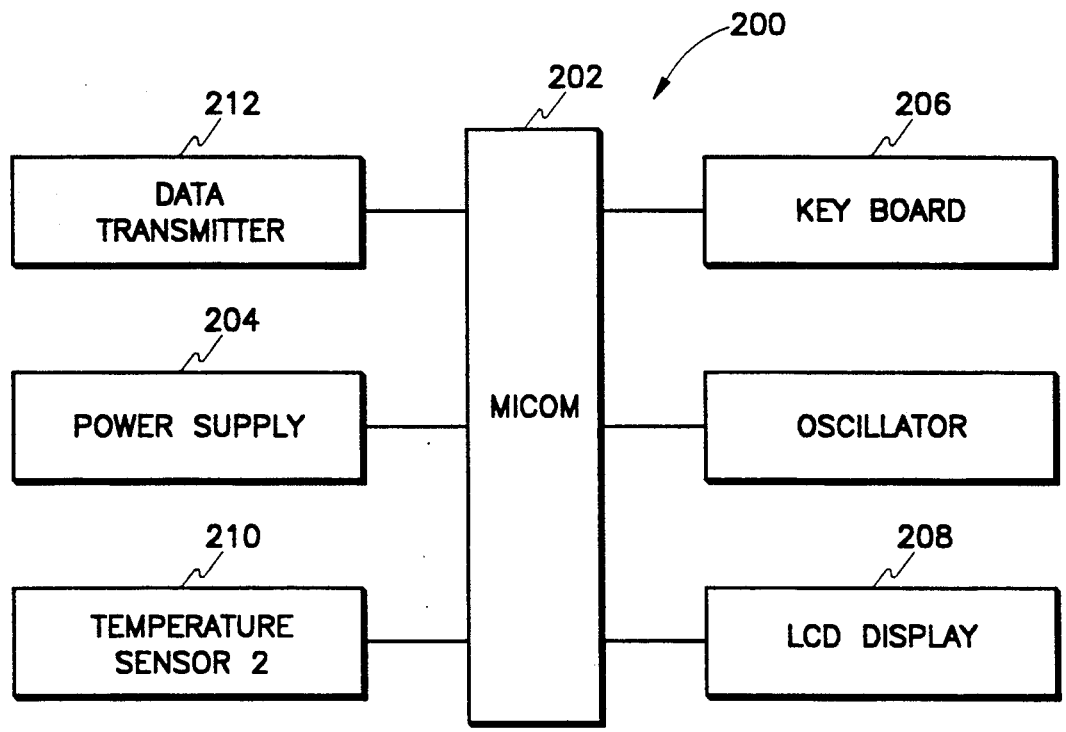
FIG. 2 is a block diagram showing an embodiment of the remote controller.

FIG. 2 is a block diagram showing an embodiment of the remote control labeled generally as 200. Microprocessor 202 is supplied power from power supply 204 and sequentially controls each circuit of the remote control unit. Driving control commands are input to microprocessor 202 by keyboard 206 and LCD display 208 shows the operating state of the remote control. The remote control is similar to those used for TVs and VCRs as understood by artisans, but is adapted for temperature sensing for use with the present invention. The second indoor temperature sensing portion 210 and data transmitter 212, which outputs temperature data sensed in the second temperature sensing portion 210, are also included in the remote control unit.

Figure 3:
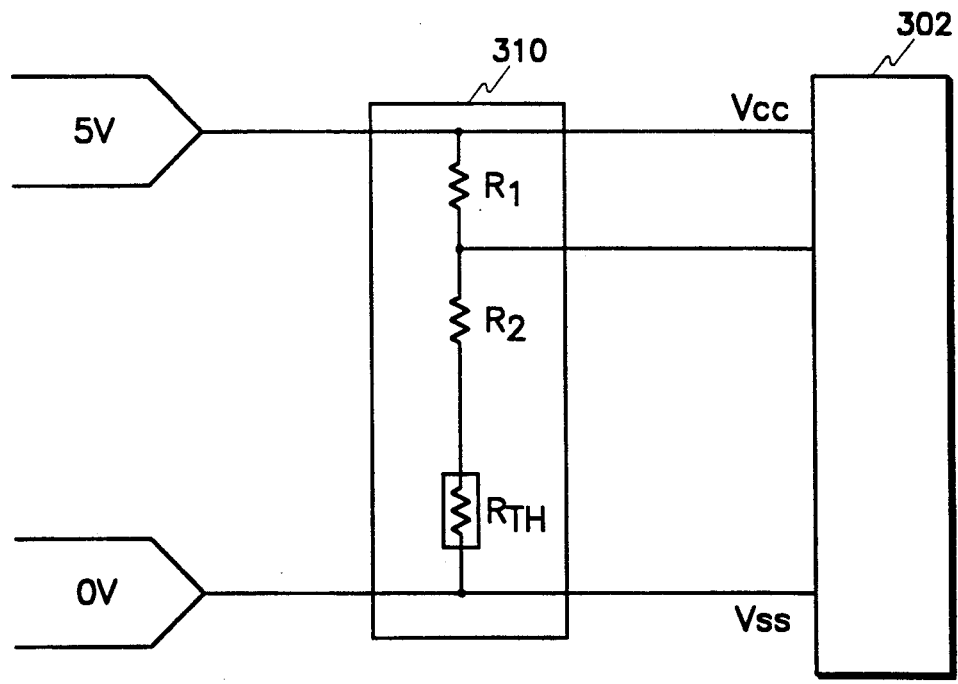
FIG. 3 is an embodiment of the circuit sensing indoor temperature.

FIG. 3 shows one embodiment of the circuit for sensing indoor temperature. The second indoor temperature sensing portion 310 connected to microprocessor 302 comprises a voltage divider with resistors R1, R2 and a thermister RTH for sensing indoor temperature.

Figure 4:
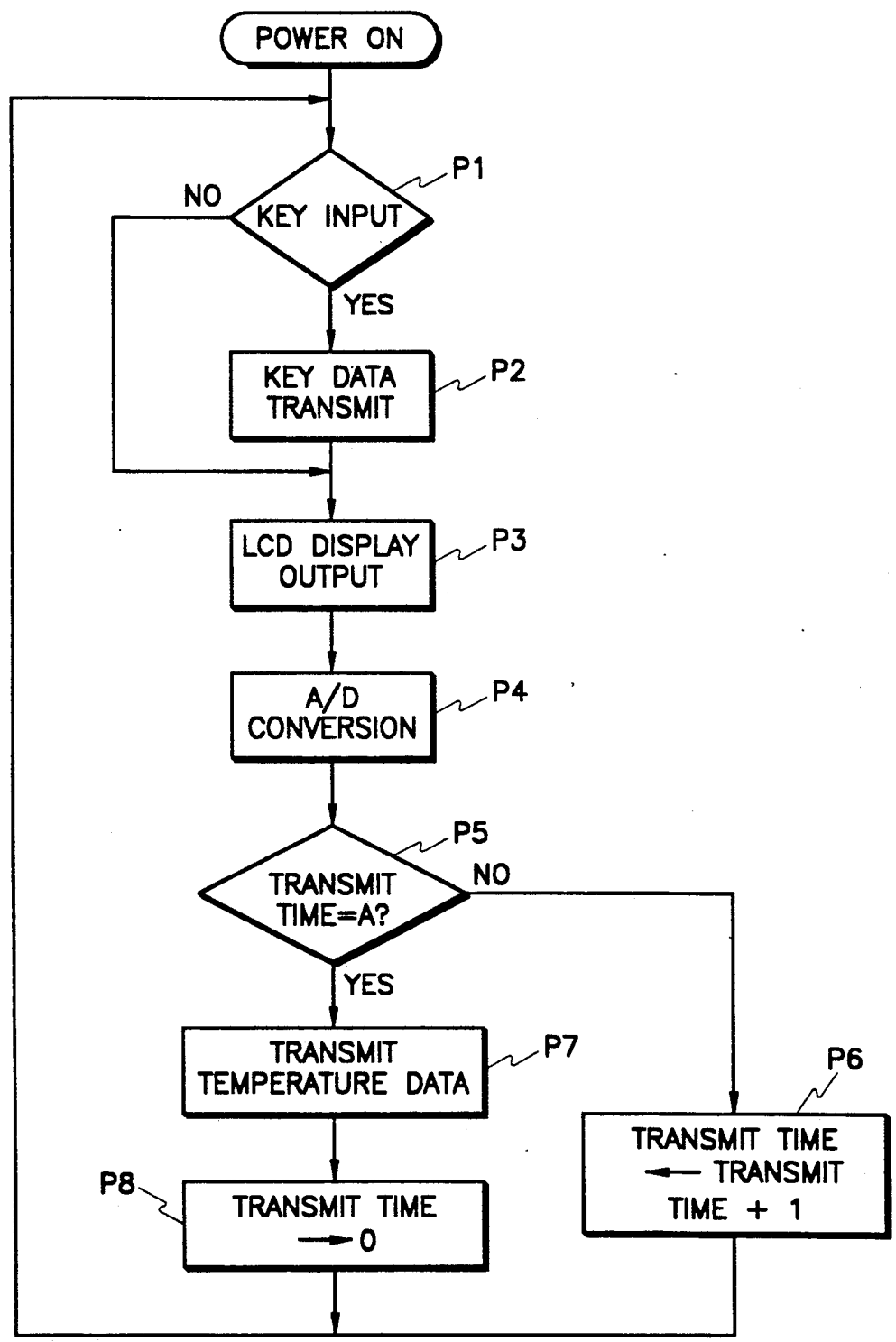
FIG. 4 is an explanatory flow chart of the operation of the embodiment shown in FIG. 2.

FIG. 4 is an explanatory flow chart showing the operation of the embodiment shown in FIG. 2. When keyboard input is applied to microprocessor 202 at process block P1 after the power is on, the instructions indicated at process block P2 are executed to control data transmitter 212 shown in FIG. 2 and to transmit key data to the air conditioning and heating system by radio transmission. Instructions indicated by process block P3 are executed to display the current state of the system on the LCD display means.

Instructions indicated by process block P4 are executed for microprocessor 202 to receive output from the second indoor temperature sensing portion 210, and to convert this analog signal to a digital signal, and to store the digital data in memory.

Instructions indicated by process block P5 are executed to decide whether or not the transmitting time of the indoor temperature data is setting time (A). In case the transmitting time is not equal to the setting time (A), instructions indicated at process block P6 are executed to increase the transmitting time by 1. Then, the process is repeatedly executed until the transmitting time is equal to the setting time (A). Then the data sensed is transmitted to the air conditioning and heating system by execution of process block P7. In process block P8, the transmitting time is cleared and then P1 to P8 are repeatedly executed so that data near the indoor temperature is transmitted to the air conditioning and heating system every setting time interval (A).

Figure 5A:
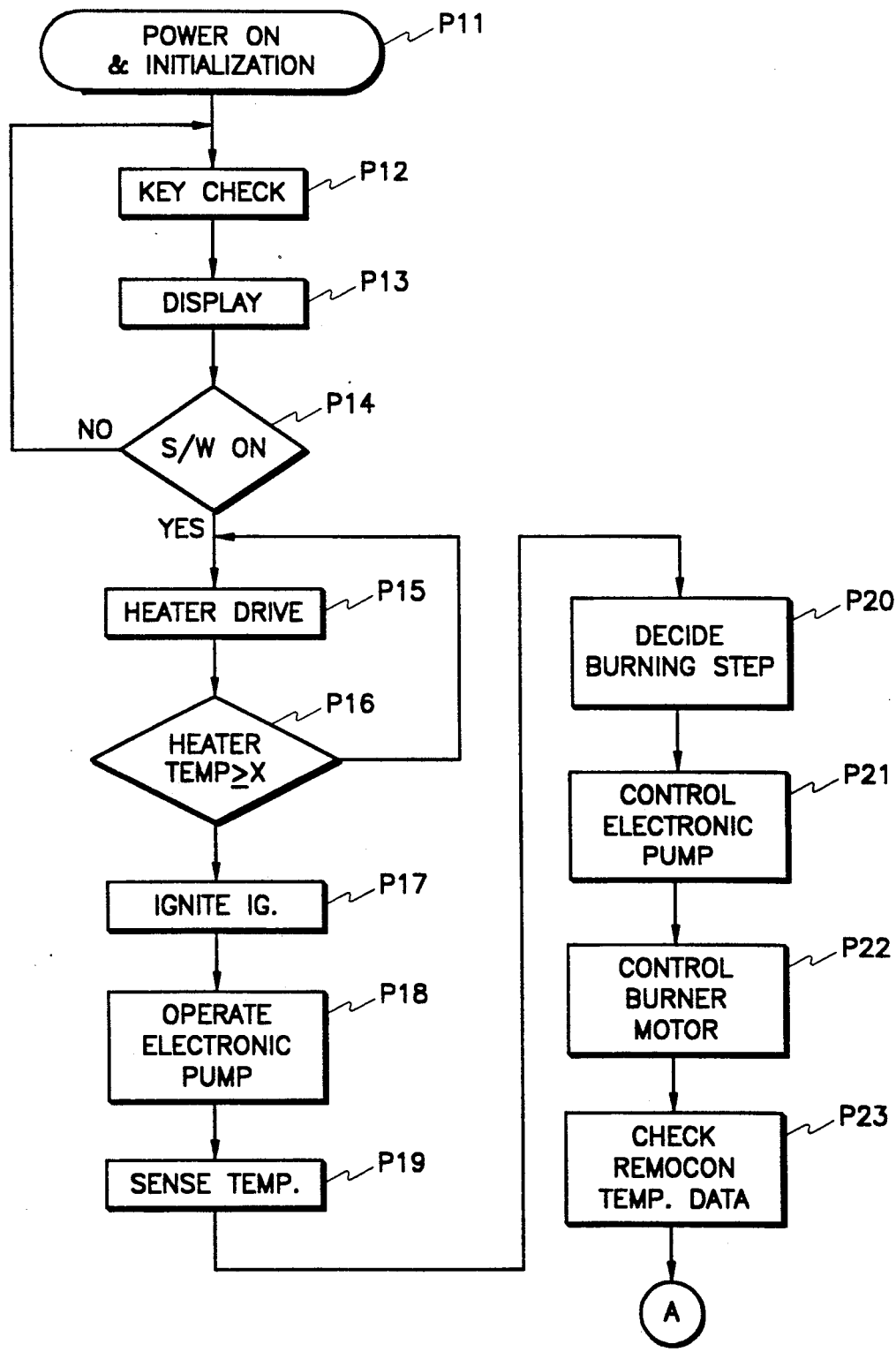
FIG. 5A-B is an explanatory flow chart of the operation of the embodiment shown in FIG. 1.
Figure 5B:
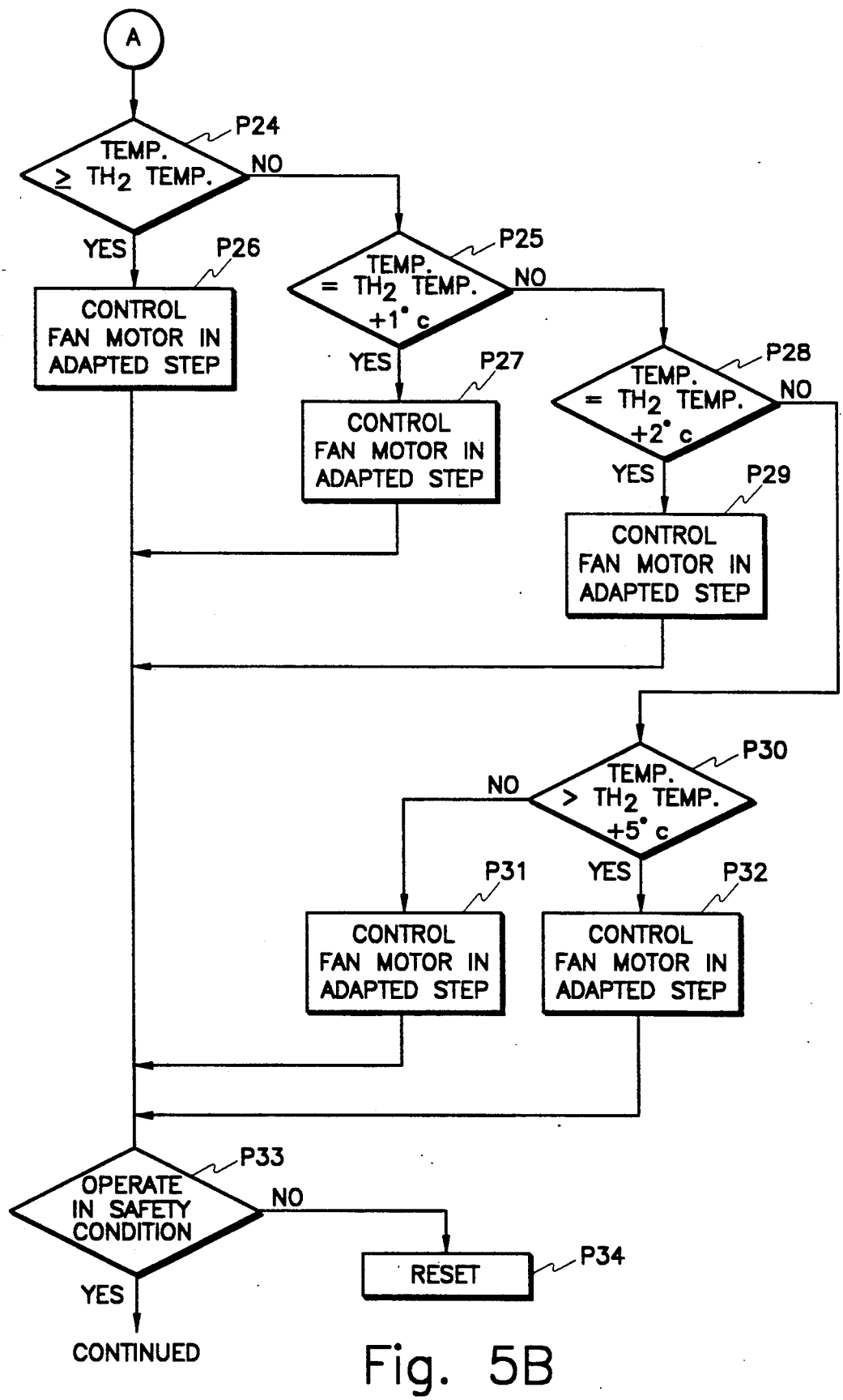

FIG. 5 is a flow chart showing the operation of the air conditioning and heating system shown in FIG. 1. The power is on in process block P11. Keyboard input is checked in process block P12 and then the operation of the system appears in the LCD display by executing instructions in process block P13. Instructions indicated by process block P14 are executed to determine the state of the operating switch. If the heater is in operation, the heater is driven in process block P15 and the heater temperature is compared with the igniting reference temperature in process block P16. In case the heater temperature is equal to or higher than the igniting reference temperature, instructions indicated by process block P17 are executed to ignite the burner with the igniter, and fuel is supplied to the burner by operating the electronic pump in process block P18. In process block P19, the indoor temperature and setting temperature are sensed and the calorification of the heating system is determined by comparing the two (referring to FIG. 7).

After the calorification is decided as above, the electronic pump is controlled and the fuel quantity suitable for calorification is supplied to the burner by executing instructions at process block P21. Then the decided calorification is generated by controlling the burner motor at process block P22.

The air conditioning and heating system is operated by processing data transmitted from the remote control in the following stages. Indoor temperature data transmitted from the remote control is checked by a set of instructions indicated by process block P23. When the setting indoor temperature is equal to or higher than data of the temperature sensor attached to the remote control (TH$_2$), the convection fan motor is controlled in steps adapted to calorification by a set of instructions indicated by process block P26. When the setting indoor temperature is lower than said sensed temperature, the setting indoor temperature is increased by 1° C. and then it is compared with the sensed indoor temperature at the remote control. In case the setting indoor temperature is equal to the sensed temperature, in block P27 the convection fan motor is controlled by data stored in address of 1A00+4+ heating step −X and a set of instructions indicated by process block P33 is executed.

When the temperature difference is above 1° C. in process block P25, the sensed indoor temperature is compared with TH$_2$ increased by 2° C. temperature at the remote control by executing a set of instructions indicated by process block P28.

In the case when setting room temperature increased by 2° C. is equal to the indoor temperature at the remote control, process block P29 controls the convection fan motor by data stored in address of 1A00+4+ heating step −X and a set of instructions indicated by process block P33 is executed.

When the temperature difference is above 2° C. at process block P28, the sensed room temperature at the remote control is compared with the setting indoor temperature increased by 5° C. by executing a set of instructions indicated by process block P30.

In case the indoor temperature sensed at the remote control is lower than setting indoor temperature increased by 5° C., the convection fan motor is controlled by data stored in address of 1A00+4+ heating step −X and a set of instructions indicated by process block P33 is executed.

In case the indoor temperature increased by 5° C. in stage of process block P30, a set of instructions indicated by process block P32 is executed. Here X is a value indicated by the table of FIG. 6.

Therefore, the indoor temperature sensed at the remote control is compared with the setting indoor temperature in the air conditioning and heating system, so that each of the driving means is controlled by data obtained from the processes above, and a set of instructions indicated by process block P33 is executed to drive the air conditioning and heating system in a safe state of operation. Thus a comfortable indoor air room environment is achieved.

FIG. 6 is a controlling reference diagram for the convection fan motor. Value of 0, +1, +2, etc. are differences among steps of calorification divided into 27 steps in the air conditioning and heating system.

FIG. 7 is a memory map storing rpm data for the convection fan motor. The reference rpm of the fan motor is data (DATA 5) in an address determined by: (1A00+ heating step +4). In heating step 05, fan motor is controlled by data (DATA 10) in address (1A09) determined by: (1A00+05 +4).

The sensor sensing indoor temperature is attached to the remote control and indoor temperature data sensed in the sensor is transmitted to the air conditioning and heating system every predetermined time (A). Indoor temperature sensed at the remote control is compared with a predetermined indoor temperature setting at a sensor attached to the air conditioning and heating system by microprocessor (100), so that the distribution of indoor temperature, and the difference between temperatures in proximity of a user and the air conditioning and heating system is sensed and is used to control indoor temperature.

Accordingly, when the indoor temperature sensed by the sensor of the remote control is equal to the indoor temperature sensed in the air conditioning and heating system, control means determines whether or not convection in the room is suitable for living, and the fan motor is controlled by data adapted to the heating step. However, when the indoor temperature sensed by the remote control is lower than the indoor temperature sensed in the air conditioning and heating system, control means decides whether or not convection in the room is suitable for living and the rpm of the convection fan motor is increased according to the diagram of FIG. 6, to result in smooth convection. The flow chart about these processes is shown in FIGS. 4 and 5.

Even if the indoor temperature sensed in the sensor of the air conditioning and heating system is equal to the indoor temperature sensed at the sensor of the remote control, the control system decides that convection is not efficiently generated at lower temperature rather than higher temperature and increases the rpm of the convection fan motor to circulate convection current more rapidly.

For example, in the case when the present indoor temperature in proximity of the air conditioning and heating system is 23° C., and the difference between the indoor temperature in the air conditioning and heating system and room temperature at the sensor of the remote control is 2° C. (room temperature=room temperature sensed in remote control +2° C.) and the heating step is the tenth step among 27 steps (strong 00-weak 1A), the electronic pump and burner motor are driven in degree adapted to the tenth step. The convection fan motor is controlled at the rpm of the eighth step higher than the tenth step by two steps, so that the indoor air is comfortable for living.

So as to make indoor air comfortable, controlling according to the invention compares indoor temperature sensed at the remote control sensor with indoor temperature sensed in the air conditioning and heating system. Each driving unit and the rpm of the fan motor is controlled by data adapted to the distribution of indoor temperature, thereby the most appropriate convection is achieved. Calorification is variously generated and the rpm of the fan motor is controlled by multistage operation.

Particularly, the invention focuses on a heating system, but has the advantage of application to an air conditioning system controlled by data temperature sensed by a remote control sensor.

What is claimed is:

1. A control method for an air conditioning and heating system comprising:
   (A) a remote control control method comprising the steps of:
      deciding a desired temperature state at the remote control by reading temperature information input to a keyboard;
      displaying said input state on an LCD display;
      converting analog temperature data sensed by a sensor attached to the remote control to digital temperature data; and
      transmitting said digital data at predetermined setting time intervals;
   (B) an air conditioning and heating set control method comprising:
      checking the state of a second keyboard input;
      deciding the state of an operating switch;
      determining said heater and air conditioner set temperature;
      controlling driver control means comprising igniter, electronic pump and burner motor;
      checking said digital temperature data transmitted from said remote control;
      comparing said digital temperature data transmitted from said remote control with said determined heater and air conditioner set temperature; and
      controlling fan motor speed to adjust said heater and air conditioner set temperature according to a difference between said digital temperature data transmitted from said remote control and said determined heater and air conditioner set temperature.

2. The control method for an air conditioning and heating system of claim 1, wherein the last step further includes the step of:
   adjusting said heater and air conditioner set temperature by increments divided into 1° C., 2° C., 5° C., wherein the increment is chosen based on said difference.

* * * * *